United States Patent [19]

Patti

[11] Patent Number: 4,807,658
[45] Date of Patent: Feb. 28, 1989

[54] FLEXIBLE ADJUSTABLE-CORE AIR HOSE

[76] Inventor: Anthony J. Patti, 27610 Fairview Ave., Hayward, Calif. 94542

[21] Appl. No.: 189,068

[22] Filed: May 2, 1988

[51] Int. Cl.$^4$ ............................................. F16K 31/46
[52] U.S. Cl. ................................... 137/223; 251/293; 251/294; 152/415
[58] Field of Search ......................... 137/223; 152/415; 251/293, 294

[56] References Cited

U.S. PATENT DOCUMENTS

| 1,555,049 | 9/1925 | Williams | 137/223 X |
| 1,736,191 | 11/1929 | Dundin et al. | 152/415 |
| 2,211,063 | 8/1940 | Kowalkiewicz | 251/294 X |
| 2,551,038 | 5/1951 | Nebout | 137/223 X |
| 2,612,931 | 10/1952 | Orlicki, Jr. | 152/415 |
| 3,019,831 | 2/1962 | Morrello | 152/415 |
| 3,463,552 | 8/1969 | Colletti | 152/415 X |
| 3,926,241 | 12/1975 | Evankovich et al. | 152/415 |

Primary Examiner—John Rivell
Attorney, Agent, or Firm—Linval B. Castle

[57] ABSTRACT

A flexible extension air hose particularly for use with dual wheel tires on trucks or recreation vehicles. The hose contains a slidable central cable that extends to a nozzle that screws to the tire valve stem and contacts the valve. The other end of the hose is fitted with an coupling that may be manually adjusted to compensate for variations in the length of the central cable that is caused by bending in the hose. Thus, a air service nozzle pressed to the coupling causes the cable to depress the tire valve so that air may be added or the tire deflated from some convenient position.

7 Claims, 1 Drawing Sheet

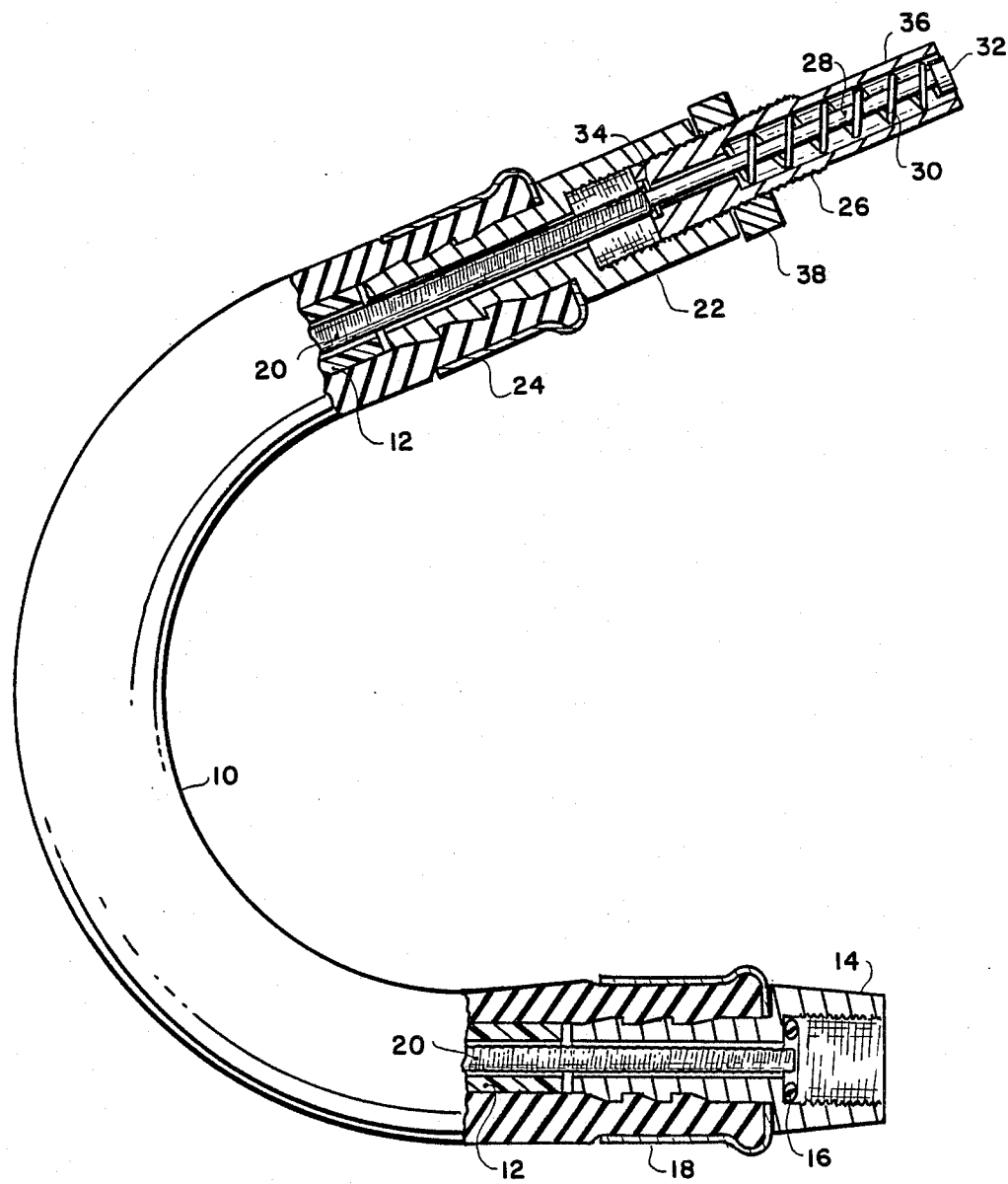

FLEXIBLE ADJUSTABLE-CORE AIR HOSE

CROSS REFERENCE TO RELATED APPLICATIONS

The invention disclosed herein is related to my co-pending design U.S. patent application Ser. No. 06,896,739, Filed Aug. 15, 1986 and entitled "Dual Wheel Hub Cap with Integral Tire Connecting Hose".

BACKGROUND OF THE INVENTION

This invention relates to flexible air hose extensions and in particular to air hoses that may extend between dual wheel tires of a vehicle and the wheel hub.

There are numerous types of air hose extensions and air systems for controlling or equalizing the air pressure in vehicle dual tires. The simplest and most reliable extension hose is one which not only can add air to tires but which can also reduce the air pressure in a tire. This type of hose must, of course, contain a central cable or shaft which is operable from the air source service nozzle and can depress the spring loaded tire valve.

While the design of such a hose with a central valve-control cable is simple, a problem develops when the hose is bent, a requirement if such a hose is to be used for pressure control of dual wheel tires from the dual wheel hub. The bending of such a hose extends the effective length of the central shaft so that, to avoid tire valve leakage, the air hose central cable must be accurately tailored for a particular bend.

The flexible air hose to be described can be used straight, bent or knotted and the contained valve actuating cable will properly and accurately function without dangers of tire leakage.

Briefly described, the flexible air hose of the invention has, at one end, a conventional threaded female air nozzle for connection to a tire valve stem and, at the second end, an elongated threaded female coupling. A flexible, close-wound spring or cable extends through the length of the hose and extends slightly from the hose end and into the female coupling when the hose is straight. A male threaded adjustment nipple with a spring biased central actuating pin is screwed into the female coupling to a position at which the inner end of the actuating pin contacts the end of the flexible cable. The exterior end of the adjustment nipple is similar in shape to a valve stem so that a standard air source service nozzle pressed over the exterior end will depress the actuating pin and hence the flexible cable in the extension hose. When the extension hose is bent and its flexible cable is effectively lengthened, the adjustment nipple is backed out of the female coupling and a lock nut secures it at the proper position so that it will continue to actuate the tire valve.

BRIEF DESCRIPTION OF THE DRAWING

The single drawing is a sectional view illustrating the preferred embodiment of the invention.

DETAILED DESCRIPTION

As shown in the drawing, the flexible hose is a rubber sheathed hose 10 with a smooth Nylon or Teflon tubular interior liner 12. At one end of the hose is a female hose connection nozzle 14 with a threaded bore for connection to a conventional tire valve stem. A rubber or plastic O-ring 16 is preferably placed in the bore of the nozzle for proper seating of the threaded valve stem, and after insertion of the nozzle 14 in the hose 10, an exterior sleeve 18 is crimped around the hose to secure it to the nozzle. Located within the bore of the tubular liner 12 and the bore of the nozzle is a close wound spring or cable 20 such as used for speedometer or bicycle brake cables. The cable 20 may have a diameter of about 2.5 mm., a length slightly longer than the rubber hose 10, and should have a smooth polished exterior for easy sliding within the liner and nozzle.

The opposite end of the flexible air hose 10 is fitted with a female air hose coupling 22 which is secured to the hose by a crimped sleeve 24. The coupling 22 extends from the end of the rubber hose and has a threaded bore into which is screwed an elongated, externally threaded, tubular, adjustment nipple 26. As shown, the flexible cable 20 extends throughout the length of the hose 10 and into the coupling 22.

The bore of the adjustment nipple 26 contains a longitudinal actuating pin 28 that extends the length of the nipple A portion of the bore of the nipple 26 is counterbored to a larger diameter to accommodate a coil spring 30 that seats against and is confined by a head 32 on the exterior end of the actuating pin. The spring 30 biases the pin 28 out from entering the bore of the nipple. The pin 28 is prevented from movement out from the bore of the nipple by a small diametrically placed locking pin 34 adjacent the interior end of the actuating pin 28.

In operation, the adjustment nipple 26 with its contained spring biased actuating pin 28 is first backed out of the female coupling 22 by using flat wrench or thumb-screw sections 36 ground on the exterior tubular surface of the nipple. The flexible air hose is then connected to a tire valve stem and bent, as required, into its position for use. The adjustment nipple 26 is then screwed into the coupling 22 to the point at which the interior end of the actuating pin 28 contacts the end of the central flexible cable 20 and so that its opposite end contacts the end of the tire valve. The nipple 26 is then locked with a locknut 38 threaded on the exterior of the nipple and locked against the exterior end of the coupling 22

To remove air from an overinflated tire, it is now only necessary to depress the head 32 on the actuating pin 28 of the hose associated with that tire. The tire is inflated by merely applying the air source service nozzle to the end of the adjustment nipple 26 so that the central pin in the service nozzle depresses the actuating pin 28.

What is claimed:

1. An extension hose for coupling a tire valve stem to a position at which air may be introduced into the hose through a conventional air source service nozzle, said air hose comprising:

a flexible hose having first and second ends;

a female nozzle on the first end of said hose, said nozzle being tubular and having a threaded bore section for attachment to a tire valve stem;

a flexible cable having first and second ends, said cable slideably extending through said flexible hose, the first end of said cable extending into said female nozzle for contacting the end of a tire valve coupled to said nozzle, said second cable end extending to the second end of said hose;

a tubular coupling assembly on the second end of said hose, said assembly having an exterior end for mating with a conventional air source service nozzle and a actuating pin responsive to the valve opening pin in a service nozzle for depressing the second end of said flexible cable, said assembly including manually adjustable means for varying the length of said coupling assembly according to length variations in said cable caused by bending of said hose.

2. The extension hose claimed in claim 1 wherein said tubular coupling assembly includes a tubular coupling having a threaded bore into which a nipple is screwed for said manual adjustment of the length of said assembly.

3. The extension hose claimed in claim 2 wherein said nipple includes a spring biased actuator pin extending from the exterior end of said nipple to the second end of said flexible cable, the biasing of said spring acting to urge said actuator pin from contact with said flexible cable.

4. The extension hose claimed in claim 3 wherein a portion of the exterior surface of said nipple is flat for grasping said nipple.

5. The extension hose claimed in claim 1 wherein said flexible hose is internally lined with a smooth tubular liner.

6. The extension hose claimed in claim 5 wherein said tubular liner is Nylon.

7. The extension hose claimed in claim 5 wherein said cable has a smooth exterior surface for ease in sliding through said tubular liner.

* * * * *